US008552594B2

(12) United States Patent
Wada et al.

(10) Patent No.: US 8,552,594 B2
(45) Date of Patent: Oct. 8, 2013

(54) NONCONTACT POWER FEED SYSTEM, NONCONTACT RELAY APPARATUS, NONCONTRACT POWER RECEPTION APPARATUS, AND NONCONTACT POWER FEED METHOD

(75) Inventors: Hirotsugu Wada, Kanagawa (JP); Kenichi Fujimaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 590 days.

(21) Appl. No.: 12/820,330

(22) Filed: Jun. 22, 2010

(65) Prior Publication Data

US 2011/0018359 A1 Jan. 27, 2011

(30) Foreign Application Priority Data

Jul. 23, 2009 (JP) .................................. 2009-171797

(51) Int. Cl.
- *H01F 27/42* (2006.01)
- *H01F 37/00* (2006.01)
- *H01F 38/00* (2006.01)

(52) U.S. Cl.
USPC .......................................................... 307/104

(58) Field of Classification Search
USPC .......................................................... 307/104
See application file for complete search history.

(56) References Cited

U.S. PATENT DOCUMENTS

| 2007/0222542 | A1 | 9/2007 | Joannopoulos et al. | |
| 2012/0119698 | A1* | 5/2012 | Karalis et al. | 320/108 |

* cited by examiner

*Primary Examiner* — Carlos Amaya
(74) *Attorney, Agent, or Firm* — Oblon, Spivak, McClelland, Maier & Neustadt, L.L.P.

(57) ABSTRACT

A noncontact power feed system includes: a noncontact power feed apparatus including a power feed resonance device to supply alternate-current power to an electronic apparatus by resonance in a noncontact manner, and an alternate-current power source section to generate the alternate-current power and supply it to the power feed resonance device; a noncontact relay apparatus including a relay resonance device to receive the alternate-current power and relay it to another electronic apparatus by resonance in a noncontact manner, a relay-side rectifier circuit to form direct-current power for output, and a movement means for moving the noncontact relay apparatus by the direct-current power; and at least one noncontact power reception apparatus including a power reception resonance device to receive the alternate-current power by magnetic field resonance in a noncontact manner, a power-reception-side rectifier circuit to form direct-current power for output, and a load means driven by the direct-current power.

15 Claims, 12 Drawing Sheets

$$fr = \frac{1}{2\pi\sqrt{L \cdot C}} \quad \cdots (1)$$

Related Art

| | Magnetic field resonance type | Electromagnetic induction type |
|---|---|---|
| Transmission distance | Long | Short (sharply attenuate when separated) |
| Deviation between transmission/ reception coils | Keep high efficiency even with deviated position and angle | Sharply attenuate |
| Frequency selectivity | Present | Absent |
| Power feed in one-to-n correspondence | Possible | Difficult (insufficient distance) |

FIG.13

Related Art

NONCONTACT POWER FEED SYSTEM, NONCONTACT RELAY APPARATUS, NONCONTRACT POWER RECEPTION APPARATUS, AND NONCONTACT POWER FEED METHOD

BACKGROUND OF THE INVENTION

1. Field of the Invention

The present invention relates to a noncontact power feed system that feeds power by using resonance phenomena such as magnetic field resonance and electric field rescnance, an apparatus used in the system, and a noncontact power feed method used for the system and the apparatus.

2. Description of the Related Art

As techniques of enabling electric energy to be transmitted in a noncontact manner, there are an electromagnetic induction system and a magnetic field resonance system. The electromagnetic induction system and the magnetic field resonance system are different from each other in various points as described below, and in recent years, an energy transmission using the magnetic field resonance system has attracted attention.

FIG. 11 is a block diagram showing a structural example of a magnetic-field-resonance-type noncontact power feed system in which a power feed source and a power feed destination have a one-to-one relationship. The magnetic-field-resonance-type noncontact power feed system shown in FIG. 11 includes a power feed source 100 and a power feed destination 200.

As shown in FIG. 11, the power feed source 100 such as a charging base includes an AC power source 101, an excitation device (coupling device) 102, and a resonance device 103. Further, the power feed destination 200 such as a cellular phone terminal includes a resonance device 201, an excitation device (coupling device) 202, and a rectifier circuit 203.

The excitation device 102 and the resonance device 103 of the power feed source 100, and the resonance device 201 and the excitation device 202 of the power feed destination 200 are each constituted of an air-cored coil. Inside the power feed source 100, the excitation device 102 and the resonance device 103 are strongly coupled to each other by electromagnetic induction. Similarly, inside the power feed destination 200, the resonance device 201 and the excitation device 202 are strongly coupled to each other by electromagnetic induction.

When a self-resonant frequency of the resonance device (air-cored coil) 103 of the power feed source 100 coincides with that of the resonance device (air-cored coil) 201 of the power feed destination 200, a magnetic field resonance relationship is obtained, in which a coupling amount becomes a maximum and a loss becomes a minimum.

Specifically, in the noncontact power feed system shown in FIG. 11, AC power (energy such as alternating current) having a predetermined frequency from the AC power source 101 is first supplied to the excitation device 102, which induces AC power in the resonance device 103 by electromagnetic induction in the power feed source 100. In this case, a frequency of the AC power that is generated in the AC power source 101 is set to be the same as the self-resonant frequencies of the resonance device 103 of the power feed source 100 and the resonance device 201 of the power feed destination 200.

As described above, the resonance device 103 of the power feed source 100 and the resonance device 201 of the power feed destination 200 are provided in the magnetic field resonance relationship. Therefore, the AC power (energy such as alternating current) is supplied from the resonance device 103 to the resonance device 201 in a noncontact manner at the self-resonant frequency.

In the power feed destination 200, the AC power supplied from the resonance device 103 of the power feed source 100 is received by the resonance device 201. The AC power from the resonance device 201 is supplied to the rectifier circuit 203 via the excitation device 202 by electromagnetic induction, and converted into DC power and output from the rectifier circuit 203.

Thus, the AC power is supplied from the power feed source 100 to the power feed destination 200 in a noncontact manner. It should be noted that the DC power output from the rectifier circuit 203 is supplied to a charging circuit connected with a battery, and used for charging the battery.

In the noncontact power feed system in which the power feed source 100 and the power feed destination 200 that are structured as shown in FIG. 11 have a one-to-one correspondence, the following features are found.

The noncontact power feed system has a relationship as shown in FIG. 12A, between a frequency of an AC power source and a coupling amount. As is found from FIG. 12A, the coupling amount is not increased even when the frequency of the AC power source is low or high, but the coupling amount becomes a maximum only at a specific frequency at which a magnetic field resonance phenomenon is caused. In other words, frequency selectivity is shown by magnetic field resonance.

Moreover, the noncontact power feed system has a relationship as shown in FIG. 12B, between a distance from the resonance device 103 to the resonance device 201, and a coupling amount. As is found from FIG. 12B, the coupling amount is smaller as the distance between the resonance devices is larger.

However, a shorter distance between the resonance devices does not increase the coupling mount, and a distance at which the coupling mount becomes a maximum exists at a certain frequency. Further, it is found from FIG. 12B that if the distance between the resonance devices has a certain range, a coupling mount above a certain level can be ensured.

In addition, the noncontact power feed system has a relationship as shown in FIG. 12C, between a resonant frequency and a distance between the resonance devices at which a maximum coupling mount is obtained. Specifically, it is found that when the resonant frequency is low, the distance between the resonance devices is large. Further, it is found that when the resonant frequency is high, a maximum coupling mount is obtained by narrowing the interval between the resonance devices.

In an electromagnetic-induction-type noncontact power feed system that has been widely used in recent years, it is necessary to share a magnetic flux between a power feed source and a power feed destination and to arrange the power feed source and the power feed destination very close to each other in order to efficiently transmit power, in which alignment of coupling axes is also important.

On the other hand, in the noncontact power feed system using the magnetic field resonance phenomenon, it is possible to transmit power with the resonance devices being more away from each other than in the electromagnetic induction system by the principle of the magnetic field resonance phenomenon, as described above. In addition, this noncontact power feed system has an advantage that transmission efficiency is not decreased so much even if the alignment of axes is not favorable.

In summary, as shown in FIG. 13, there are differences between the magnetic-field-resonance-type noncontact power feed system and the electromagnetic-induction-type noncontact power feed system. As shown in FIG. 13, the magnetic-field-resonance-type noncontact power feed system has an advantage in a deviation between transmission/reception coils (resonance devices), with the result that a transmission distance can be made longer.

Accordingly, in the case of the magnetic-field-resonance-type noncontact power feed system, it is possible to charge a plurality of power feed destinations (cellular phone terminals) by placing them on one power feed source (charging base) as shown in FIG. 14.

It should be noted that US Patent Application No. 2007/0222542 discloses a technique regarding a power transmission system using the magnetic field resonance system as described above.

SUMMARY OF THE INVENTION

Incidentally, in a case of a magnetic-field-resonance-type power supply technique, for example, a transmission distance is longer and a deviation between transmission/reception coils causes less influence than in an electromagnetic-induction-type power supply technique that has been used from the past, as described above. In addition, the magnetic-field-resonance-type power supply technique allows a repeater to intervene and accordingly has high flexibility.

Therefore, in the case of the magnetic-field-resonance-type power supply technique, it is highly possible to enable new power-supply mode and a new power-use mode in the new power-supply mode to be created, not merely to supply power from a power feed source to a power feed destination. This applies to not only the magnetic-field-resonance-type noncontact power feed system but also a noncontact power feed system of another resonance type other than an electromagnetic resonance type, for example.

In view of the points described above, it is desirable to provide a new power-supply mode that uses a resonance-type power supply technique, and a new power-use mode in the new power-supply mode.

According to an embodiment of the present invention, there is provided a noncontact power feed system including: a noncontact power feed apparatus including a power feed resonance device to supply alternate-current power to an electronic apparatus by resonance in a noncontact manner, and an alternate-current power source section to generate the alternate-current power having a frequency corresponding to a resonant frequency of the power feed resonance device and supply the alternate-current power to the power feed resonance device; a noncontact relay apparatus including a relay resonance device to receive supply of the alternate-current power from the power feed resonance device of the noncontact power feed apparatus by resonance in a noncontact manner and relay the alternate-current power to another electronic apparatus by resonance in a noncontact manner, a relay-side rectifier circuit to form direct-current power based on the alternate-current power supplied from the relay resonance device and output the direct-current power, and a movement means for moving the noncontact relay apparatus by being driven by the direct-current power from the relay-side rectifier circuit; and at least one noncontact power reception apparatus including a power reception resonance device to receive supply of the alternate-current power from the relay resonance device of the noncontact relay apparatus by magnetic field resonance in a noncontact manner, a power-reception-side rectifier circuit to form direct-current power based on the alternate-current power supplied from the power reception resonance device and output the direct-current power, and a load means driven by the direct-current power from the power-reception-side rectifier circuit.

By the noncontact power feed system according to the embodiment of the present invention, in the noncontact power feed apparatus, the alternate-current power from the alternate-current power source is transmitted via the power feed resonance device in the noncontact manner.

In the noncontact relay apparatus, the alternate-current power from the noncontact power feed apparatus is received via the relay resonance device and supplied to the movement means via the relay-side rectifier circuit, with the result that the noncontact relay apparatus is moved. Simultaneously, the alternate-current power received via the relay resonance device is transmitted to another electronic apparatus (noncontact power reception apparatus) via the relay resonance device.

Specifically, the noncontact relay apparatus has a function of relaying the alternate-current power from the noncontact power feed apparatus to another electronic apparatus (noncontact power reception apparatus) while moving by the alternate-current power from the noncontact power feed apparatus.

Further, in the at least one noncontact power reception apparatus, the alternate-current power from the movable noncontact relay apparatus is received via the power reception resonance device and supplied to a load circuit via the power-reception-side rectifier circuit, with the result that the load circuit is driven.

With this structure, the alternate-current power (energy such as alternating current) from the noncontact power feed apparatus can be supplied to the noncontact relay apparatus in the noncontact manner and can move the noncontact relay apparatus. Then, the alternate-current power (energy such as alternating current) can be relayed and supplied to the at least one noncontact power reception apparatus via the movable noncontact relay apparatus.

As described above, it is possible to supply the alternate-current power to the at least one noncontact power reception apparatus as a target via the movable noncontact relay apparatus, and operate the load means in the at least one noncontact power reception apparatus.

Accordingly, it is possible to drive the load means in the at least one noncontact power reception apparatus by supplying power to the at least one noncontact power reception apparatus not only in the noncontact manner but also using the moving noncontact relay apparatus as a relay.

Specifically, through the mediation of a moving noncontact power reception/relay apparatus, it is possible to provide a new power-supply mode that uses a power supply technique of a so-called resonance type such as a magnetic field resonance type and a new power-use mode in the new power-supply mode.

According to the embodiment of the present invention, it is possible to realize a new power-supply mode that uses a resonance-type power supply technique and a new power-use mode in the new power-supply mode.

These and other objects, features and advantages of the present invention will become more apparent in light of the following detailed description of best mode embodiments thereof, as illustrated in the accompanying drawings.

BRIEF DESCRIPTION OF DRAWINGS

FIG. 13 is a table showing comparison results of the magnetic-field-resonance-type noncontact power feed system and an electromagnetic-induction-type noncontact power feed system.

DESCRIPTION OF PREFERRED EMBODIMENTS

Hereinafter, embodiments of an apparatus and a method according to the present invention will be described with reference to the drawings. Though the present invention is applicable to various resonance systems such as a magnetic field resonance system, an electric field resonance system, and an electromagnetic resonance system, an example in which the magnetic field resonance system is used will be described below.

(First Embodiment)

(Outline of Noncontact Power Feed System of First Embodiment)

Figure 1:
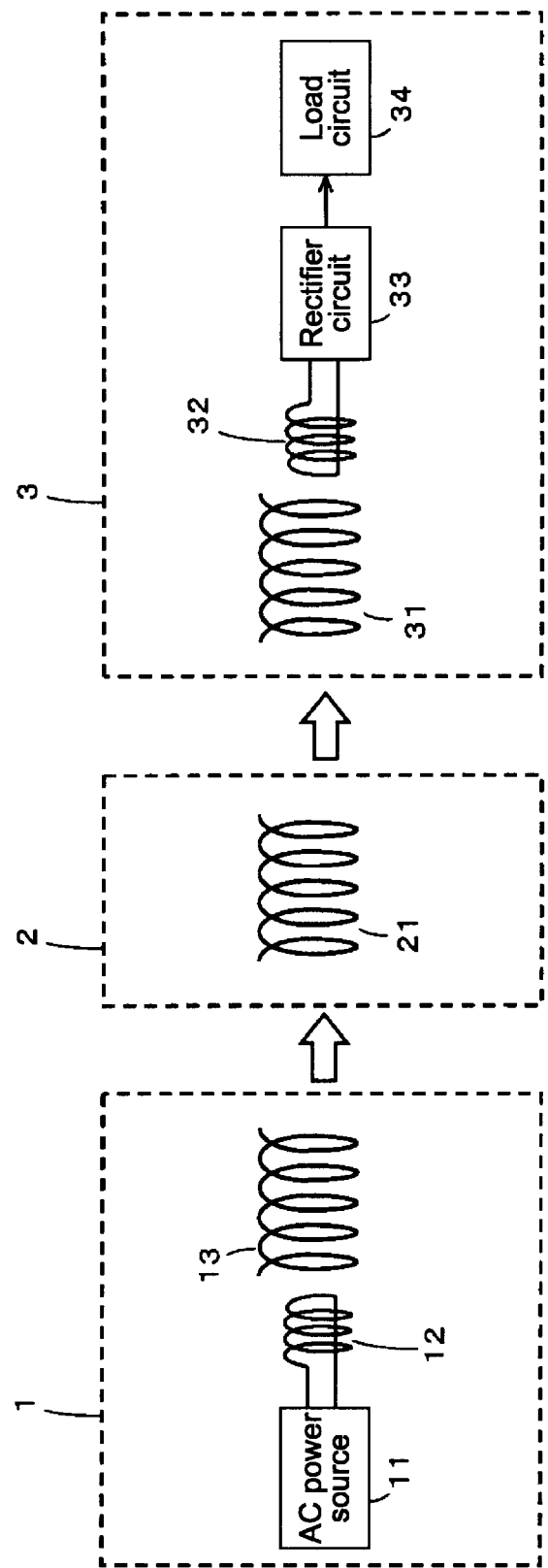
FIG. 1 is a diagram for explaining a structural example of a magnetic-field-resonance-type noncontact power feed system according to a first embodiment of the present invention.

FIG. 1 is a diagram for explaining a structural example of a magnetic-field-resonance-type noncontact power feed system according to a first embodiment of the present invention. As shown in FIG. 1, the noncontact power feed system of this embodiment includes a power feed source 1, a moving body 2, and a power feed destination 3. It should be noted that a plurality of power feed destinations that are similarly structured can be used, which will be described later in detail.

The power feed source 1 uses a magnetic field resonance system to supply power to another electronic apparatus in a noncontact manner, thus realizing a function as a noncontact power feed apparatus.

The moving body 2 receives power from the power feed source 1 and has a function as a relay apparatus that supplies the power to another electronic apparatus and a function of using the power to drive a drive motor thereof, thus realizing a function as a noncontact relay apparatus.

The power feed destination 3 receives supply of power from the power feed source 1 via the moving body 2 and uses the power to drive a load circuit thereof, thus realizing a function as a noncontact power reception apparatus in this embodiment.

As shown in FIG. 1, the power feed source 1 includes an AC power source 11, a coupling coil (coupling device (excitation device)) 12, and a transmission resonance coil (resonance device) 13.

As shown in FIG. 1, the moving body 2 includes a relay resonance coil (resonance device) 21 that receives power (AC power) from the power feed source 1 and transmits the power to the power feed destination 3. It should be noted that though not shown in FIG. 1, the moving body 2 includes a coupling coil (coupling device (excitation device)), a rectifier circuit, a drive motor, and the like and also has a structure in which part of the power supplied from the power feed source 1 is used for driving a drive motor thereof.

As shown in FIG. 1, the power feed destination 3 includes a reception resonance coil (resonance device) 31, a coupling coil (coupling device (excitation device)) 32, a rectifier circuit 33, and a load circuit 34. It should be noted that the load circuit 34 of the power feed destination 3 is constituted of an LED (Light Emitting Diode), an LED driver, and the like.

The coupling coil 12 and the transmission resonance coil 13 of the power feed source 1, the relay resonance coil 21 and the not-shown coupling coil of the moving body 2, and the reception resonance coil 31 and the coupling coil 32 of the power feed destination 3 each have a structure of an air-cored coil.

The AC power source 11 of the power feed source 1 generates AC power (energy such as alternating current) having a frequency that is the same or substantially the same as a self-resonant frequency of the transmission resonance coil 13 of the power feed source 1, and supplies it to the excitation device 12.

It should be noted that each of the relay resonance coil 21 of the moving body 2 and the reception resonance coil 31 of the power feed destination 3 also has a self-resonant frequency that is the same or substantially the same as that of the transmission resonance coil 13 of the power feed source 1.

In other words, in the magnetic-field-resonance-type noncontact power feed system shown in FIG. 1, the transmission resonance coil 13 of the power feed source 1, the relay resonance coil 21 of the moving body 2, and the reception resonance coil 31 of the power feed destination 3 each have the same or substantially the same resonant frequency.

Further, in order to generate AC power having a target frequency, the AC power source 11 of the power feed source 1 includes a Colpitts oscillator or a Hartley oscillator, for example.

The coupling coil 12 is a device that supplies AC power to the transmission resonance coil 13 by being oscillated by the AC power from the AC power source 11. The coupling coil 12 that receives supply of the AC power from the AC power source 11 and the transmission resonance coil 13 are strongly coupled to each other by electromagnetic induction. Accordingly, the AC power from the AC power source 11 is supplied to the transmission resonance coil 13 via the coupling coil 12.

It should be noted that the coupling coil 12 also plays a role in preventing reflection of an electric signal by matching impedance of the AC power source 11 to that of the transmission resonance coil 13. That is, in the magnetic-field-resonance-type noncontact power feed system, an unmodulated sine wave having a center frequency of f0 is normally used. Since the unmodulated sine wave is unmodulated, an occupied frequency band is narrow (0 Hz is ideal).

Accordingly, a frequency band necessary for a resonance coil that transmits the unmodulated sine wave may also be narrow, e.g., several Hz, but in order to improve transmission efficiency, a low loss (high "Q" factor) is needed. It should be noted that here, the value "Q" represents a sharpness of a resonant peak of a resonator circuit. If a resonant peak becomes sharp, the transmission efficiency of power (AC power) can be improved.

In other words, in order to obtain high transmission efficiency in a magnetic-field-resonance-type noncontact power transmission, it is desirable to obtain as high Q factor as possible in the transmission resonance coil 13 of the power feed source 1 or the reception resonance coil 31 of the power feed destination 3.

However, when the transmission resonance coil 13 is directly connected to the AC power source 11 in the power feed source 1 or the reception resonance coil 31 is directly connected to the rectifier circuit 33 in the power feed destination 3, a Q factor of the transmission resonance coil 13 or reception resonance coil 31 is lowered due to the influence of circuit impedance.

To avoid the above situation, direct connection of the transmission resonance coil 13 to the AC power source 11 is avoided in the power feed source 1 by using the coupling coil 12, with the result that impedance of the transmission resonance coil 13 is kept high and a Q factor thereof is also kept high.

Moreover, the transmission resonance coil 13 is a coil that generates a magnetic field by the AC power supplied from the coupling coil 12. The transmission resonance coil 13 has inductance and capacitance. The transmission resonance coil 13 has a maximum strength of the magnetic field at a resonant frequency.

Figures 9, 10:
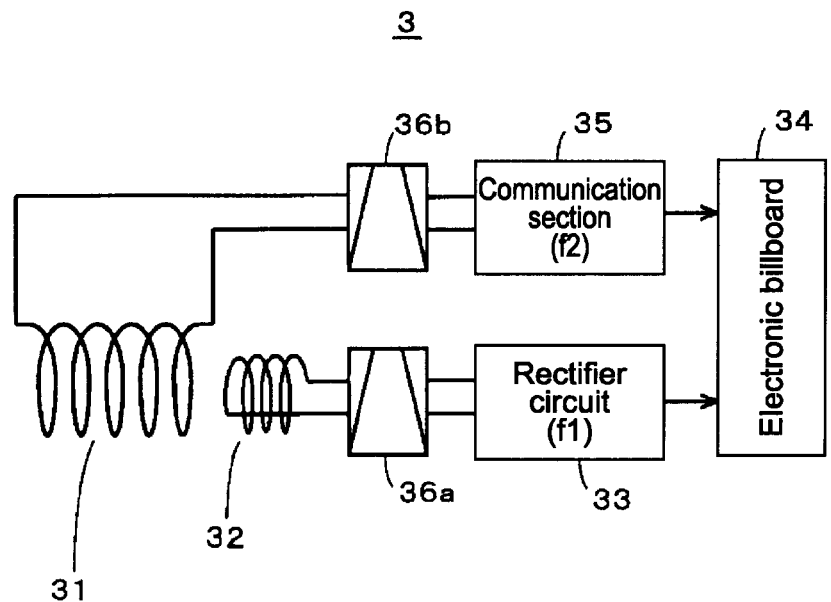
FIG. 9 is a diagram for explaining a structural example of a power feed destination of the second embodiment.
FIG. 10 is a diagram showing an expression used for calculating a resonant frequency of a resonance device.
Figure 11:
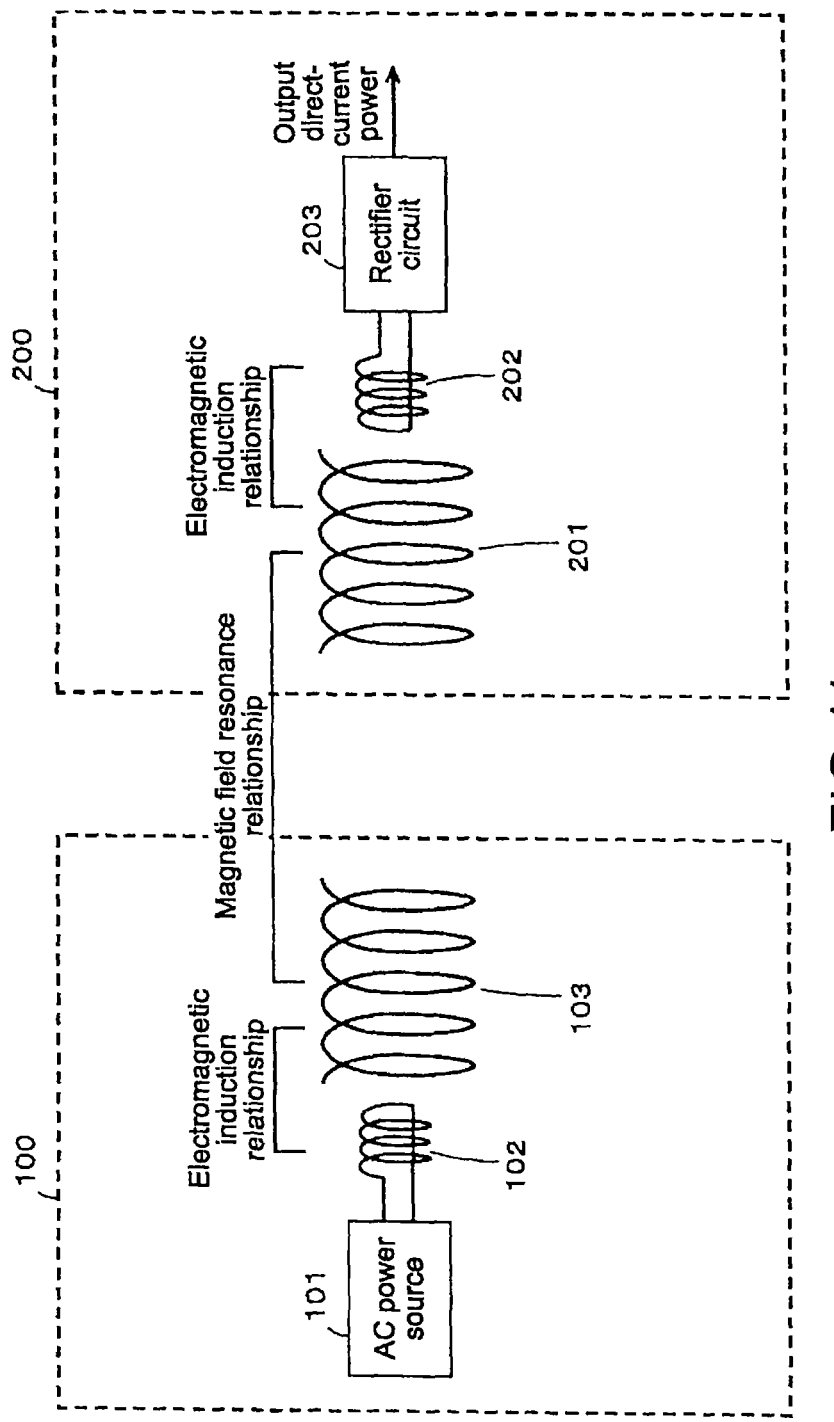
FIG. 11 is a diagram for explaining a magnetic-field-resonance-type noncontact power feed system in related art.
Figure 12A:
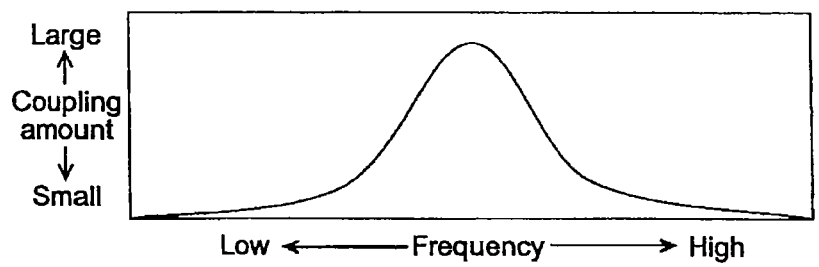
FIG. 12 are diagrams for explaining features of the magnetic-field-resonance-type noncontact power feed system.
Figure 12B:
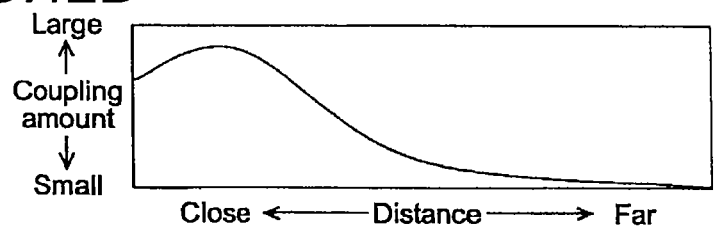
Figure 12C:
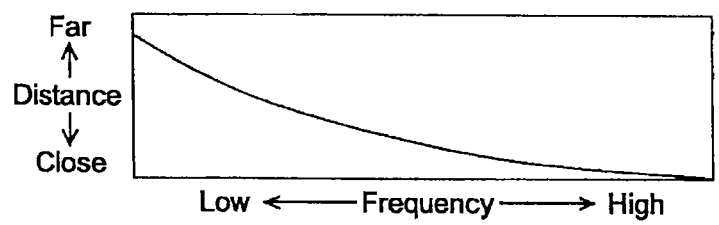
Figure 14:
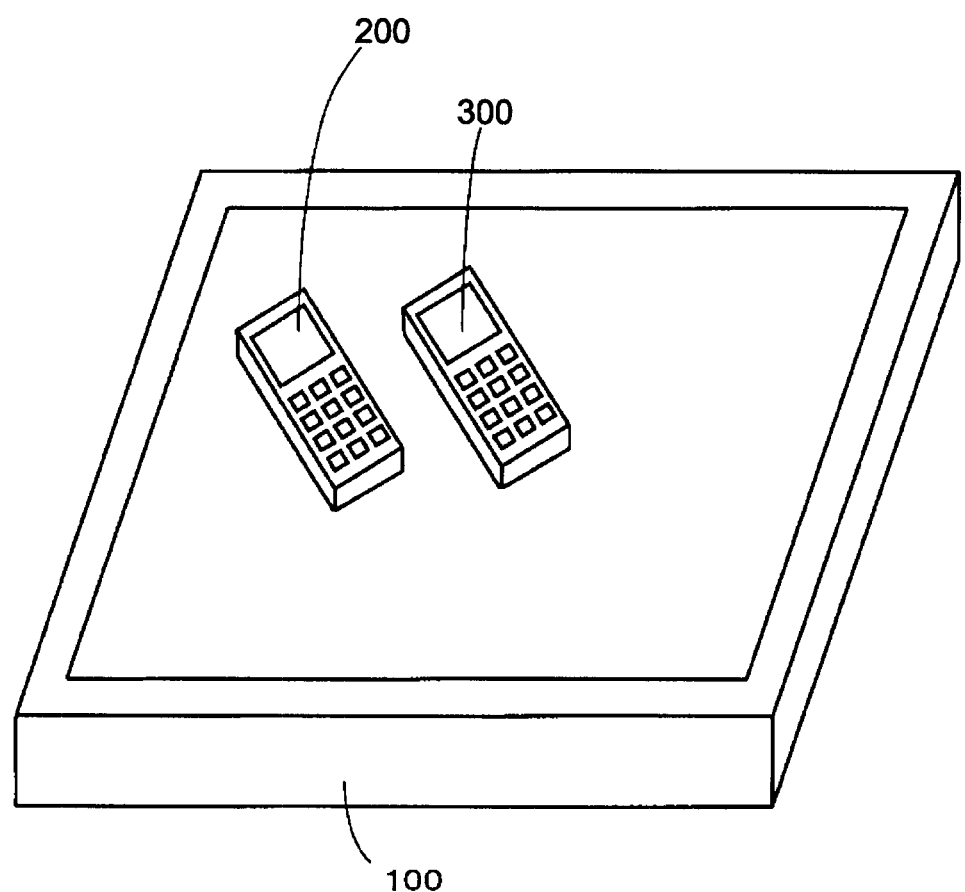
FIG. 14 is a diagram for explaining a specific example of the magnetic-field-resonance-type noncontact power feed system.

FIG. 10 is a diagram showing an expression used for calculating a resonant frequency fr of the transmission resonance coil 13. In Expression (1) shown in FIG. 10, a letter L represents inductance of the transmission resonance coil 13 and a letter C represents capacitance thereof.

Accordingly, a resonant frequency of the transmission resonance coil 13 is determined by inductance L and capacitance C of the transmission resonance coil 13. As described above, since the transmission resonance coil 13 is constituted of an air-cored coil, line-to-line capacitance of the transmission resonance coil 13 serves as capacitance. Then, the transmission resonance coil 13 generates a magnetic field in an axial direction of the coil.

The relay resonance coil 21 of the moving body 2 is a device for receiving supply of the AC power from the power feed source 1 by magnetic field coupling due to magnetic field resonance. The relay resonance coil 21 of the moving body 2 has inductance L and capacitance C as in the case of those of the transmission resonance coil 13 of the power feed source 1 that are described using Expression (1) of FIG. 10, and has a resonant frequency that is the same or substantially the same as that of the transmission resonance coil 13 of the power feed source 1.

As described above, since the relay resonance coil 21 of the moving body 2 has a structure of an air-cored coil, line-to-line capacitance thereof serves as capacitance. Then, the relay resonance coil 21 of the moving body 2 is connected to the transmission resonance coil 13 of the power feed source 1 by magnetic field resonance, as shown in FIG. 1.

Accordingly, the AC power (energy such as alternating current) at a resonant frequency is supplied from the transmission resonance coil 13 of the power feed source 1 to the relay resonance coil 21 of the moving body 2 in a noncontact manner by magnetic field resonance.

The relay resonance coil 21 of the moving body 2 is also connected to the reception resonance coil 31 of the power feed destination 3 by the magnetic field coupling due to the magnetic field resonance.

Specifically, the reception resonance coil 31 of the power feed destination 3 is a device for receiving supply of the AC power from the power feed source 1, the AC power being relayed via the moving body 2, by the magnetic field coupling due to the magnetic field resonance. The reception resonance coil 31 of the power feed destination 3 has inductance L and capacitance C as in the case of those of the transmission resonance coil 13 of the power feed source 1 that are described using Expression (1) of FIG. 10, and has a resonant frequency that is the same or substantially the same as that of the transmission resonance coil 13 of the power feed source 1.

As described above, since the reception resonance coil 31 of the power feed destination 3 has a structure of an air-cored coil, line-to-line capacitance thereof serves as capacitance. Then, as shown in FIG. 1, the reception resonance coil 31 of the power feed destination 3 is connected to the relay resonance coil 21 of the moving body 2 by the magnetic field resonance.

Accordingly, the AC power (energy such as alternating current) at a resonant frequency is supplied from the relay resonance coil 21 of the moving body 2 to the reception resonance coil 31 of the power feed destination 3 in a noncontact manner by the magnetic field resonance.

Then, as described above, the reception resonance coil 31 and the coupling coil 32 are coupled to each other by electromagnetic induction in the power feed destination 3, and the AC power is supplied from the reception resonance coil 31 to the rectifier circuit 33 via the coupling coil 32.

It should be noted that the coupling coil 32 of the power feed destination 3 also plays a role in preventing reflection of an electric signal by matching impedance of the reception resonance coil 31 to that of the rectifier circuit 33, as in the case of the coupling coil 12 of the power feed source 1.

Specifically, as in the case of the coupling coil 12 of the power feed source 1, direct connection of the reception resonance coil 31 to the rectifier circuit 33 is avoided in the power feed destination 3 by using the coupling coil 32, with the result that impedance of the reception resonance coil 31 is kept high and a Q factor thereof is also kept high.

The rectifier circuit 33 forms DC power to be supplied to the load circuit 34 as a subsequent stage, based on the AC power supplied via the coupling coil 32, and then supplies the DC power to the load circuit 34. The load circuit 34 is constituted of an LED, an LED driver, and the like as described above and also to be described later in detail, and receives supply of the AC power to cause the LED to emit light.

It should be noted that though described later in detail, the moving body 2 also includes a coupling coil, a rectifier circuit, a drive motor as a load circuit, and the like. Accordingly, the moving body 2 uses the power supplied from the power feed source 1 to drive a drive motor thereof, as well as relaying the power to the power feed destination 3.

(Outer Appearance of Noncontact Power Feed System of First Embodiment)

Figure 2:
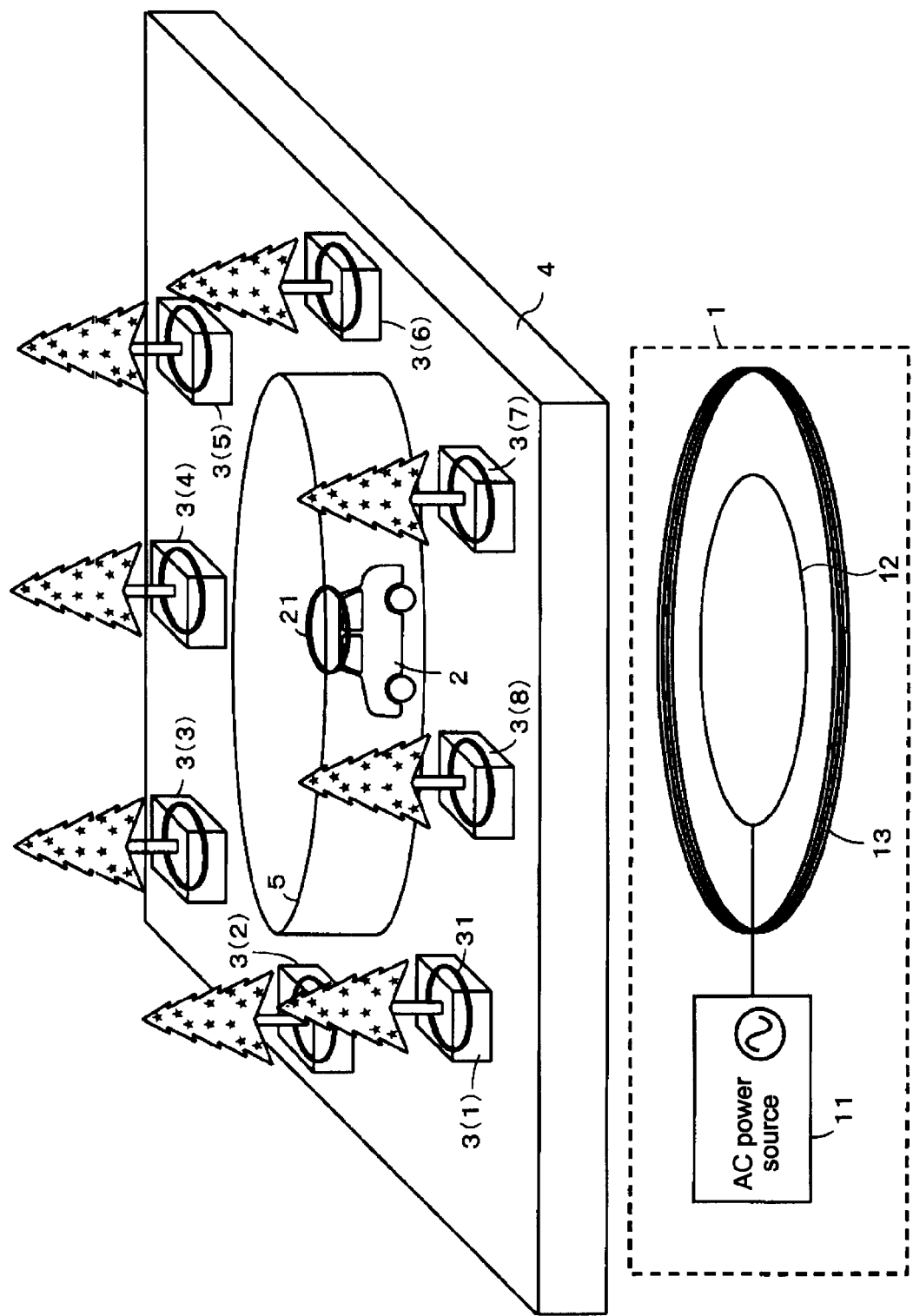
FIG. 2 is a diagram for explaining an outer appearance of the noncontact power feed system according to the first embodiment.

FIG. 2 is a diagram for explaining an outer appearance of the noncontact power feed system according to the first embodiment. In a case of the first embodiment, for example, the moving body (circulating car) 2, a circular guide plate 5 that is formed to guide travel of the moving body 2, and the power feed destinations (decorative illumination bodies) 3(1) to 3(8) are provided on a placement base 4 having about several tens of centimeters on each side. On a lower side of the placement base 4, the power feed source 1 that supplies power to the moving body 2 is provided.

A size of the transmission resonance coil 13 of the power feed source 1 and a positional relationship between the transmission resonance coil 13 and the moving body 2, or between the transmission resonance coil 13 and each power feed destination 3 are set (determined) such that the power feed source 1 can supply power to only the moving body 2.

Further, the moving body 2 receives supply of power from the power feed source 1 and uses the power to drive a drive motor thereof, thus moving the moving body 2. Then, the moving body 2 relays the power supplied from the power feed source 1 to, out of the power feed destinations 3(1) to 3(8), a power feed destination 3 that is located close to the moving body 2 after the moving body 2 is moved.

In this case, the moving body 2 may be incapable of relaying the power to all the power feed destinations 3(1) to 3(8) at the same time, but is capable of relaying the power supplied from the power feed source 1 to only one or two adjacent power feed destinations 3 that are to be more strongly coupled to the moving body 2 as the magnetic field resonance becomes stronger.

Accordingly, the moving body 2 drives the drive motor by the power supplied from the power feed source 1 in a noncontact manner, and circularly moves on the placement base 4 along the circular guide plate 5. Simultaneously, the moving body 2 relays the power supplied from the power feed source 1 in a noncontact manner and supplies the power to, out of the power feed destinations 3(1) to 3(8), only a power feed destination 3 located close thereto, and causes an LED of the power feed destination 3 to emit light.

Specifically, a large amount of power is supplied to only a power feed destination 3 (decorative illumination body) to which the moving body 2 comes close. As a result, the LEDs of the power feed destinations 3(1) to 3(8) arranged along the circular guide plate 5 sequentially emit light with the circular movement of the moving body 2 along the circular guide plate 5.

(Structural Example of Moving Body (Circulating Car) 2)

Figure 3:
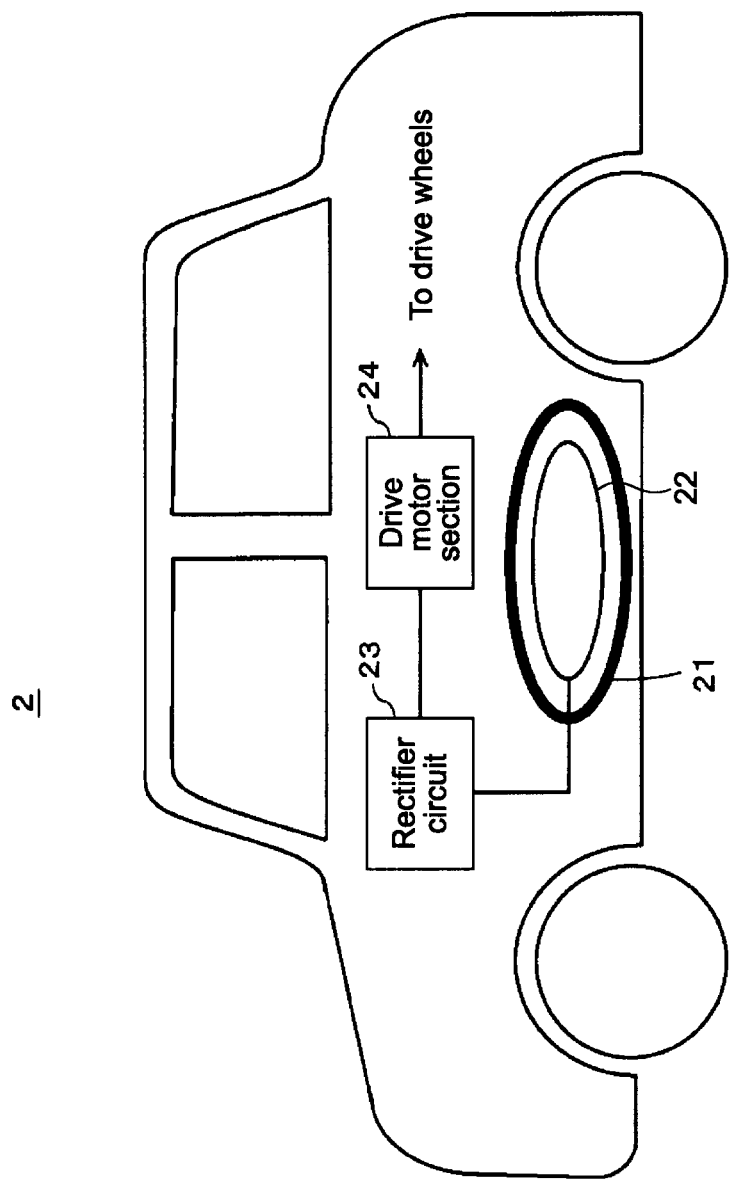
FIG. 3 is a diagram for explaining a structural example of a moving body of the noncontact power feed system according to the first embodiment.

Next, a structural example of the moving body (circulating car) 2 of the noncontact power feed system according to the first embodiment will be described. FIG. 3 is a diagram for explaining a structural example of the moving body 2 of the noncontact power feed system according to the first embodiment.

As shown in FIG. 3, the moving body 2 is in an automobile shape. The moving body 2 includes the relay resonance coil 21, a coupling coil 22, a rectifier circuit 23, and a drive motor section 24 and has a structure in which a rotation of a drive motor of the drive motor section 24 is transmitted to drive wheels of the moving body 2.

Then, though described above, the relay resonance coil 21 receives supply of the AC power (energy such as alternating current) from the transmission resonance coil 13 of the power feed source 1, to which the relay resonance coil 21 is coupled by magnetic field resonance, and supplies part of the AC power to the rectifier circuit 23 via the coupling coil 22.

The rectifier circuit 23 forms DC power from the AC power supplied thereto, and supplies the DC power to the drive motor section 24. The drive motor section 24 drives the drive motor to rotate by the DC power supplied thereto and transmits the rotation to the drive wheels.

Accordingly, the drive wheels of the moving body 2 rotate and the moving body 2 circularly moves (circularly travels) along the circular guide plate 5 on the placement base 4 as described with reference to FIG. 2.

Further, the relay resonance coil 21 of the moving body 2 is also coupled to the reception resonance coil 31 of the power feed destination 3 by magnetic field resonance, and sequentially relays (supplies) part of the power from the power feed source 1 to each of the power feed destinations 3(1) to 3(8) to which the moving body 2 comes close.

In this manner, the moving body 2 functions as a moving relay (moving repeater) that relays power from the power feed source 1 to an adjacent power feed destination 3, as well as using the power to move the moving body 2.

(Structural Example of Power Feed Destination (Decorative Illumination Body) 3)

Next, a structural example of the power feed destination (decorative illumination body) 3 of the noncontact power feed system according to the first embodiment will be described. It should be noted that as described with reference to FIG. 2, the plurality of power feed destinations 3(1) to 3(8) each having the same structure are used. Accordingly, each structure of the plurality of power feed destinations 3(1) to 3(8) will be described as a structure of the power feed destination 3 hereinafter.

Figure 4:
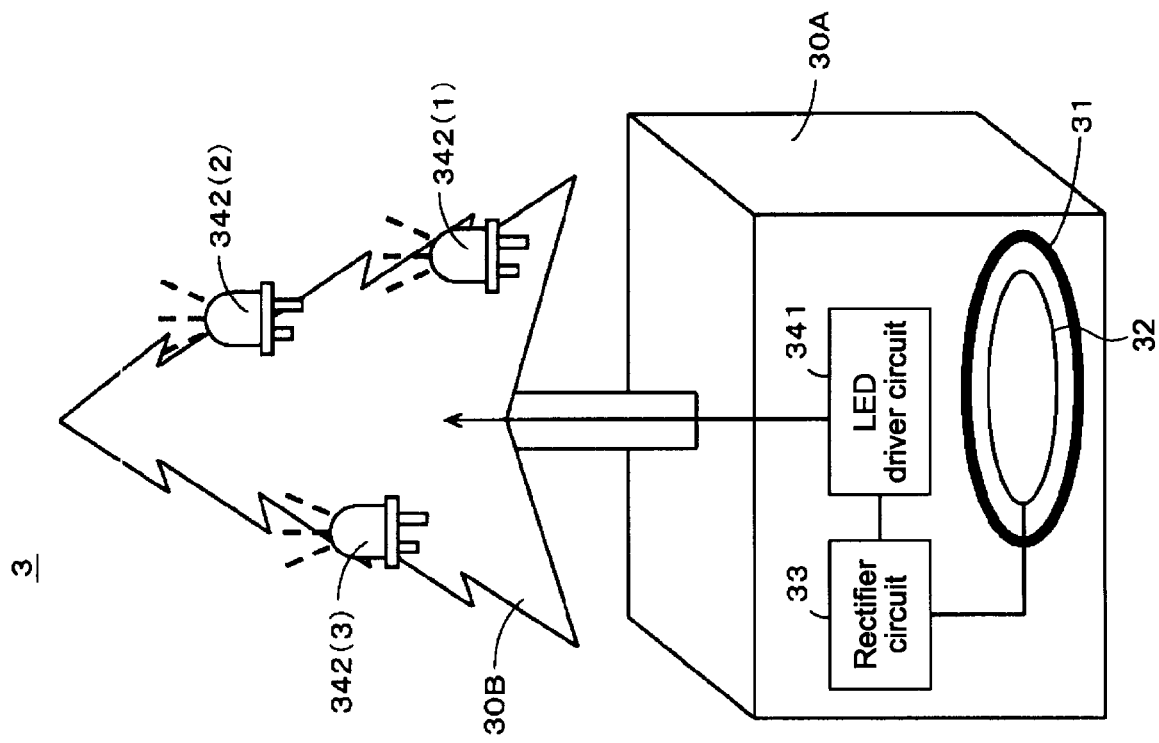
FIG. 4 is a diagram for explaining a structural example of a power feed destination (decorative illumination body) of the first embodiment.

FIG. 4 is a diagram for explaining the structural example of the power feed destination (decorative illumination body) 3 of the first embodiment. As shown in FIG. 4, the power feed destination 3 is constituted of a circuit accommodation portion 30A and a decorative illumination arrangement portion (tree portion) 30B.

As shown in FIG. 4, the circuit accommodation portion 30A includes the reception resonance coil 31, the coupling coil 32, the rectifier circuit 33, and an LED driver circuit 341 as a part of the load circuit 34. Further, the decorative illumination arrangement portion 30B includes a plurality of LEDs 342(1), 342(2), 342(3), . . . , as a part of the load circuit 34.

As described above, the reception resonance coil 31 receives supply of power (AC power) from the power feed source 1 via the relay resonance coil 21 of the moving body 2 that is coupled thereto by magnetic field resonance, and supplies the power to the rectifier circuit 33 via the coupling coil 32.

The rectifier circuit 33 forms DC power from the AC power supplied thereto and supplies the DC power to the LED driver circuit 341. The LED driver circuit 341 forms a drive current for the LEDs 342(1), 342(2), 342(3), . . . , from the DC power supplied thereto, and supplies the drive current to each of the LEDs 342(1), 342(2), 342(3), . . . .

Accordingly, the power feed destination (decorative illumination body) 3 can cause the LEDs 342(1), 342(2), 342(3), . . . , which are arranged in the decorative illumination arrangement portion 30B, to emit light when receiving the power supplied from the power feed source 1 via the moving body 2.

As described above, though the noncontact power feed system according to the first embodiment is constituted of the power feed source 1, the moving body 2, and the power feed destination 3, they are not connected to one another with wires and the power feed source 1 can supply power to the moving body 2 and each of the plurality of power feed destinations 3.

(Effects of First Embodiment)

As described above, it is unnecessary to connect the power feed source 1, the moving body 2, and the plurality of power feed destinations 3(1) to 3(8) to one another with wires in the noncontact power feed system of the first embodiment, with the result that the apparatuses constituting the system can be flexibly arranged.

For example, when the placement base 4 shown in FIG. 2 is constituted of a transparent acrylic plate or the like, it is possible to arrange the moving body 2 and each of the power feed destinations 3(1) to 3(8) in a floating state in which the moving body 2 and the power feed destinations 3(1) to 3(8) are away from the power feed source 1.

Further, in a case where the decorative illumination bodies are used as the power feed destinations as described above, it is possible to cause the decorative illumination bodies to emit light with an extremely simple structure. In other words, complicated microcomputer control or the like is completely unnecessary and it is possible to control the decorative illumination bodies to emit light sequentially.

Further, though the decorative illumination bodies are used as the power feed destinations 3 in the noncontact power feed system of the first embodiment described above, if members that mechanically operate by power are arranged instead of the decorative illumination bodies, it is possible to cause the members to mechanically operate in a wireless manner in sequence.

Members having various structures can be used as the load circuit 34, for example, in which the motor is driven and rotated to lift an object each time the moving body 2 comes close, or a shutter is released to take a picture each time the moving body 2 comes close.

Further, in the case of the noncontact power feed system of the first embodiment described above, the power feed destination 3 is constituted of the decorative illumination body and has one purpose to attract attention of people, with the result that the effect thereof can be increased with the moving body 2 being circularly moved.

Further, the power can be transmitted/received among the apparatuses in a noncontact manner, with the result that it is possible to enjoy advantages that wiring as in the related art is not carried out, the apparatuses can be arranged easily, a failure due to wrong wiring or the like is not caused, and the like.

As described above, in the case of the noncontact power feed system of the first embodiment, by using the moving body 2 as a relay apparatus of power, it is possible to form a noncontact power feed system that is pleasant to the eye without carrying out complicated wiring or the like.

Moreover, the noncontact power feed system of the first embodiment can be used as, for example, a display in various shops in addition to a toy for kids.

(Second Embodiment)

(Outline of Noncontact Power Feed System of Second Embodiment)

The noncontact power feed system according to the first embodiment described above has a relatively small size such that the noncontact power feed system can be provided on a table, for example. On the other hand, a noncontact power feed system according to a second embodiment is formed as one of amusement attractions in a theme park, in which a moving body can be moved while taking humans thereon.

Figure 5:
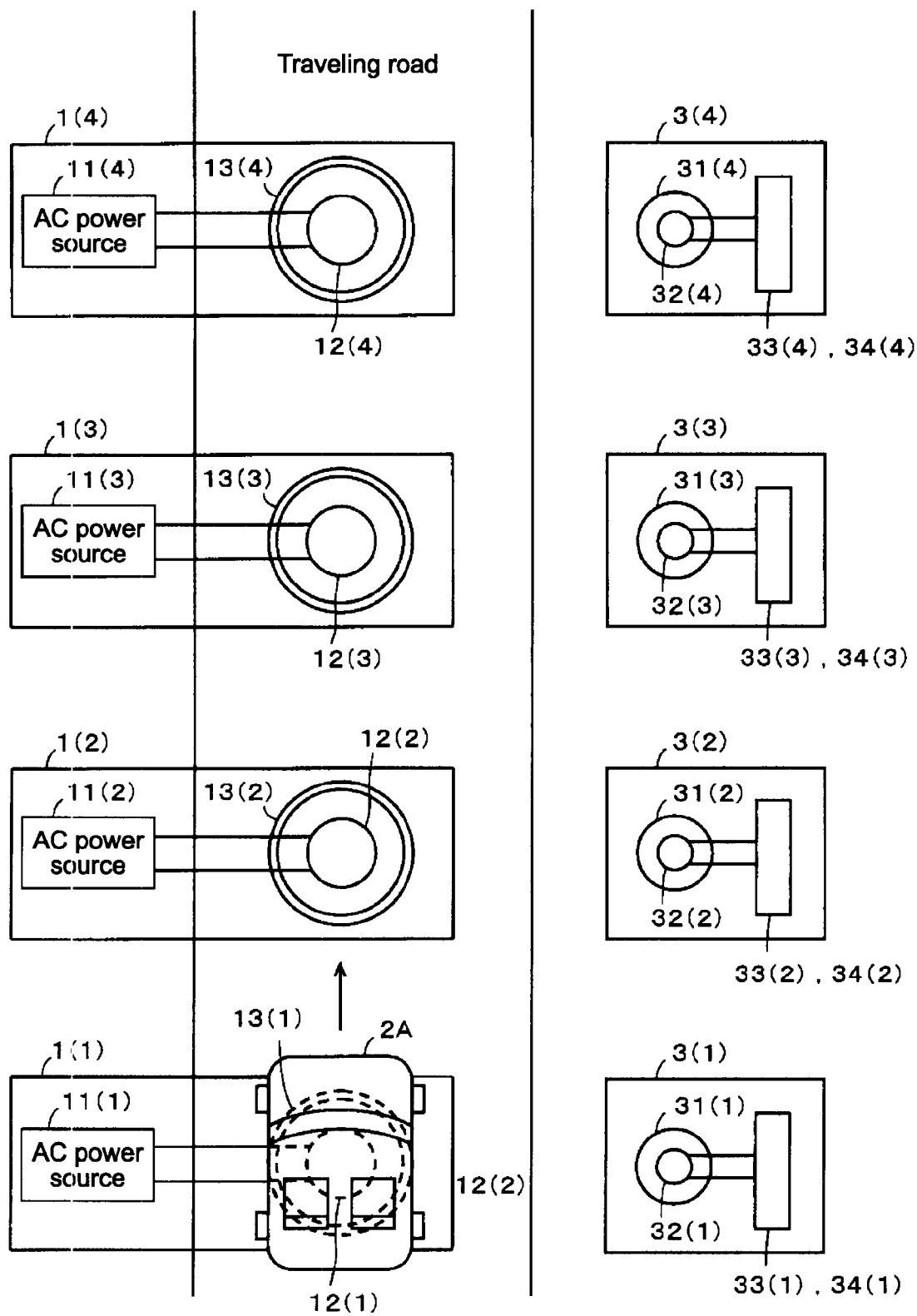
FIG. 5 is a diagram for explaining a noncontact power feed system according to a second embodiment.

FIG. 5 is a diagram for explaining the noncontact power feed system according to the second embodiment. As shown in FIG. 5, the noncontact power feed system according to the second embodiment includes a plurality of power feed sources 1(1), 1(2), 1(3), . . . , a moving body 2A having a structure of an automobile, and a plurality of power feed destinations 3(1), 3(2), 3(3), . . . .

Each of the plurality of power feed sources 1(1), 1(2), 1(3), . . . realizes a function as a noncontact power feed apparatus. Further, the moving body 2A realizes a function as a noncontact relay apparatus. Furthermore, each of the plurality of power feed destinations 3(1), 3(2), 3(3), . . . realizes a function as a noncontact power reception apparatus.

The plurality of power feed sources 1(1), 1(2), 1(3), . . . are arranged with intervals therebetween on a traveling road on which the moving body 2A travels so that the moving body 2A can be supplied with power. Each of the plurality of power feed sources 1(1), 1(2), 1(3), . . . is arranged at a position from which enough power to reach a next power feed source is supplied to the moving body 2A but from which power is difficult to be directly supplied to each of the power feed destinations 3(1), 3(2), 3(3), . . . .

Conversely, each of the plurality of power feed sources 1(1), 1(2), 1(3), . . . is arranged for a distance in which the moving body 2A can reach a next power feed source by the power supplied from each of the power feed sources 1(1), 1(2), 1(3), . . . and at a position where the power is difficult to be directly supplied to each of the plurality of power feed destinations 3(1), 3(2), 3(3), . . . .

Each of the power feed sources 1(1), 1(2), 1(3), . . . basically has the same structure as the power feed source 1 of the first embodiment shown in FIG. 1. For example, the power feed source 1(1) includes an AC power source 11(1), a coupling coil 12(1), and a transmission resonance coil 13(1). Each of the power feed sources 1(2), 1(3), . . . , also includes an AC power source 11, a coupling coil 12, and a transmission resonance coil 13.

Further, the moving body 2A basically has the same structure as the moving body 2 shown in FIG. 2. Specifically, the moving body 2A includes a relay resonance coil 21, a coupling coil 22, a rectifier circuit 23, and a drive motor section 24 to be described later.

Further, each of the power feed destinations 3(1), 3(2), 3(3), . . . basically has the same structure as the power feed destination 3 of the first embodiment shown in FIG. 3. Specifically, each of the power feed destinations 3(1), 3(2), 3(3), . . . includes a reception resonance coil 31, a coupling coil 32, a rectifier circuit 33, and a load circuit 34.

It should be noted that as described above, the power feed sources 1(1), 1(2), 1(3), . . . are arranged at positions from which the power is difficult to be directly supplied to the power feed destinations 3(1), 3(2), 3(3), . . . , respectively.

Conversely, the power feed destinations 3(1), 3(2), 3(3), . . . are arranged at positions from which the power is difficult to be received from the power feed sources 1(1), 1(2), 1(3), . . . , respectively, but can be received via the moving body 2A.

The load circuit 34 of the power feed destination 3 of tae first embodiment is constituted of the LED driver circuit 341 and the plurality of LEDs 342, whereas the load circuit 34 of each power feed destination 3 of the second embodiment is constituted of an electronic billboard and a driver circuit thereof.

Moreover, the moving body 2A takes two or several humans thereon, and by receiving power sequentially from the power feed sources 1(1), 1(2), 1(3), . . . , drives a drive motor thereof and travels on the traveling road along which the power feed sources 1(1), 1(2), 1(3), . . . are arranged.

At this time, the moving body 2A sequentially supplies power supplied from the power feed sources 1(1), 1(2), 1(3), . . . to adjacent power feed destinations 3(1), 3(2), 3(3), . . . respectively, and displays a message on an electronic billboard of each of the power feed destinations 3(1), 3(2), 3(3), . . . .

In this case, a message displayed on an electronic billboard of each of the power feed destinations 3(1), 3(2), 3(3), . . . includes various types of advertising information and the like.

(Use Mode of Noncontact Power Feed System of Second Embodiment)

Figure 6:
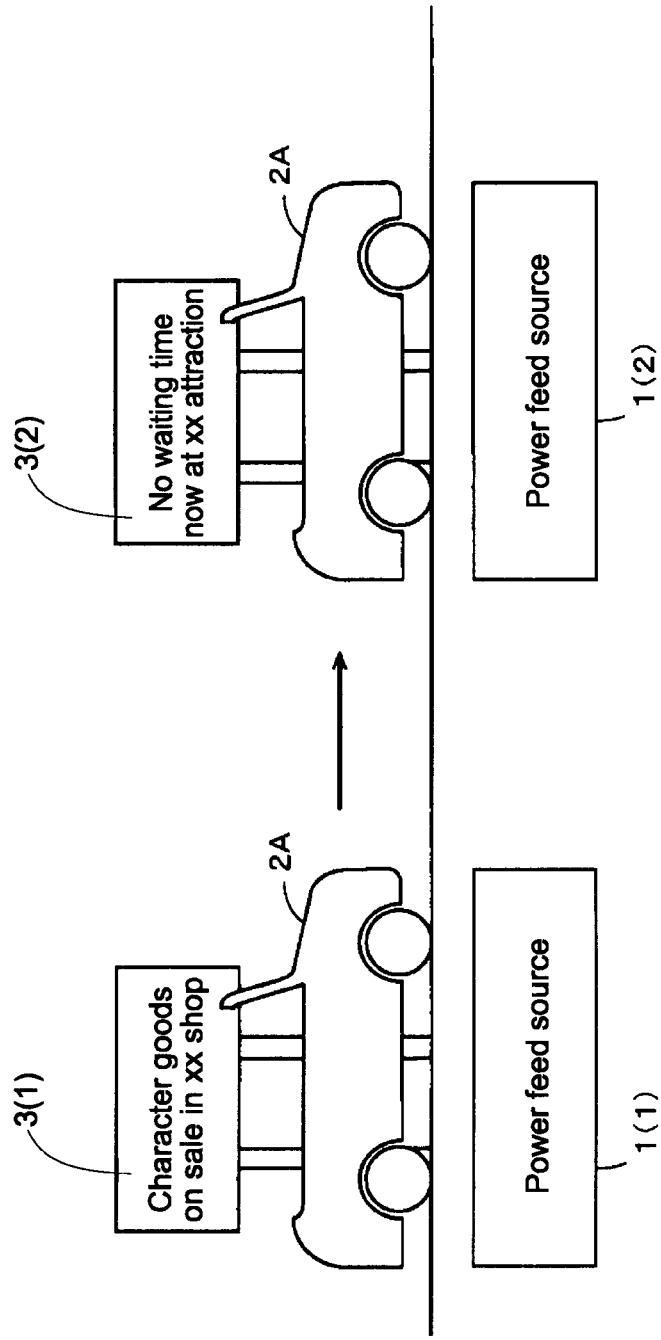
FIG. 6 is a diagram for explaining a use mode of the noncontact power feed system according to the second embodiment.

FIG. 6 is a diagram for explaining a use mode of the noncontact power feed system according to the second embodiment.

As shown in FIG. 6, the moving body 2A picks up a user (human) and sequentially receives power from the power feed sources 1(1), 1(2), . . . provided on the traveling road. Then, the moving body 2A supplies the power from the power feed sources 1 to the power feed destinations 3(1), 3(2), 3(3), . . . to which the moving body 2A comes close in turns while traveling on the traveling road.

Each of the power feed destinations 3(1), 3(2), 3(3), . . . that receives supply of the power from the moving body 2A displays a predetermined message on the electronic billboard thereof.

In a case of an example shown in FIG. 6, the moving body 2A that has received power from the power feed source 1(1) relays the power to the adjacent power feed destination 3(1). Accordingly, an advertising message indicating "Character goods on sale in xx shop" is displayed on the electronic billboard of the power feed destination 3(1).

Then, when the moving body 2A travels by the power from the power feed source 1(1) and reaches the power feed source 1(2), the moving body 2A receives power from the power feed source 1(2), and uses the power to drive the moving body 2A and also relays the power to the adjacent power feed destination 3(2) from the power feed source 1(2). Accordingly, an advertising message indicating "No waiting time in xx attraction" is displayed on the electronic billboard of the power feed destination 3(2).

It should be noted that a message displayed on the electronic billboard of each of the power feed destinations 3(1), 3(2), 3(3), . . . can be delivered in advance from a center side in a wired or wireless manner, for example.

In such a manner, the moving body 2A as an automobile carrying humans moves by being supplied with power from the power feed sources 1(1), 1(2), 1(3), . . . , and relays and supplies the power from the power feed sources 1(1), 1(2), 1(3), . . . to the power feed destinations 3(1), 3(2), 3(3), . . . sequentially.

Then, it is possible to provide the user on the moving body 2A with a display message that is timely displayed on an adjacent electronic billboard. Accordingly, it is possible for the user to obtain latest information and use it as a reference for a next behavior, and for an information provider to guide the user to a shop or another amusement attraction.

It should be noted that in the second embodiment described above, the case where the display message displayed on the electronic billboard of each of the power feed destinations 3(1), 3(2), 3(3), . . . is delivered in advance from, for example, a predetermined center or the like has been described, but the present invention is not limited thereto.

For example, in the case of the noncontact power feed system of the second embodiment, it is also possible to supply a display message to be displayed on the electronic billboard of the power feed destination 3 from the power feed source 1 to the power feed destination 3 via the moving body 2A by using a noncontact power supply path.

Hereinafter, there will be described structural examples of the power feed source 1, the moving body 2A, and the power feed destination 3 in a case where a display message to be displayed on an electronic billboard of the power feed destination 3 is supplied from the power feed source 1 to the power feed destination 3 via the moving body 2A by using a noncontact power supply path.

It should be noted that as described above, since each of the power feed sources 1(1), 1(2), 1(3), . . . has the same structure, each structure of the power feed sources 1(1), 1(2), 1(3), . . . will be hereinafter described as a structure of a power feed source 1.

Similarly, since each of the power feed destinations 3(1), 3(2), 3(3), . . . has the same structure, each structure of the power feed destinations 3(1), 3(2), 3(3), . . . will be hereinafter described as a structure of a power feed destination 3.

(Structural Example of Power Feed Source 1)

Figure 7:
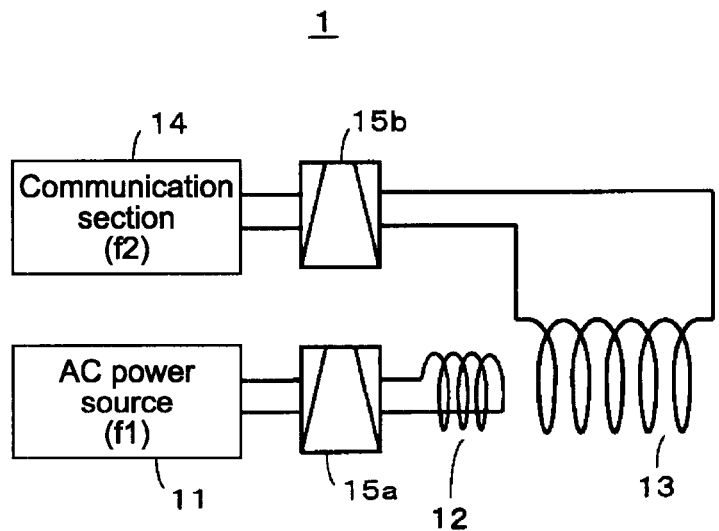
FIG. 7 is a diagram for explaining a structural example of a power feed source of the second embodiment.

First, a structural example of the power feed source 1 will be described. FIG. 7 is a diagram for explaining the structural example of the power feed source 1 of the second embodiment. The power feed source 1 of the second embodiment transmits a display message as well as supplying power.

As shown in FIG. 7, the power feed source 1 of this example includes a communication section 14 in addition to the AC power source 11, the coupling coil 12, and the transmission resonance coil 13. The communication section 14 is connected to the transmission resonance coil 13 so that the transmission resonance coil 13 can also be used as a communication antenna.

If the communication section 14 and the transmission resonance coil 13 are unconditionally connected to each other, impedance of the transmission resonance coil 13 is lowered and a Q factor thereof is also lowered, which causes power feeding efficiency to be lowered.

In this regard, in the power feed source 1 of the second embodiment, a filter circuit 15a is provided between the AC power source 11 and the coupling coil 12, and a filter circuit 15b is provided between the communication section 14 and the transmission resonance coil 13.

Specifically, as also described above, a frequency band necessary for power transmission is low, for example, in a range from several Hz to several tens of Hz. In contrast to this, a frequency band necessary for information transmission is wider as information is transmitted at higher speed. In such a case, at least several kHz is necessary, or several MHz to several GHz may be necessary in some cases.

In the second embodiment, it is assumed that a frequency f1 of AC power generated in the AC power source 11 is a value around 10 Hz and a frequency of an information transmission signal that is generated in the communication section 14 is more than several MHz, for example.

In this case, the filter circuit 15b of the power feed source 1 is designed to have sufficiently high impedance that does not lower a Q factor of the transmission resonance coil 13 at a frequency f1. Further, the filter circuit 15a of the power feed source 1 is designed to have appropriate impedance at which the coupling coil 12 does not adversely affect wireless communication at a frequency f2. Here, the appropriate impedance differs depending on the frequency f2 or a structure of the coupling coil 12.

Accordingly, in a case where power is fed from the AC power source 11, impedance of the transmission resonance coil 13 is kept high and a Q factor thereof is also kept high due to the function of the filter circuit 15b, with the result that power can be fed without lowering the power feeding efficiency.

On the other hand, in a case where information from the communication section 14 is transmitted, a frequency band of a signal of the information is set as a high-frequency band of several MHz or more and impedance is lowered due to the function of the filter circuit 15b at a time other than at the frequency f1.

In other words, the filter circuit 15b keeps impedance high at the frequency f1, and lowers the impedance other than at the frequency f1. In this case, a Q factor of the transmission resonance coil 13 can be lowered and the information signal from the communication section 14 can be desirably transmitted.

Accordingly, first, the power feed source 1 can desirably transmit a high-frequency information signal (display message) via the communication section 14, the filter circuit 15b, and the transmission resonance coil 13. After that, the power feed source 1 can transmit (feed) AC power from the AC power source 11 via the filter circuit 15a, the coupling coil 12, and the transmission resonance coil 13 without lowering the power feeding efficiency.

(Structural Example of Moving Body 2A)

Figure 8:
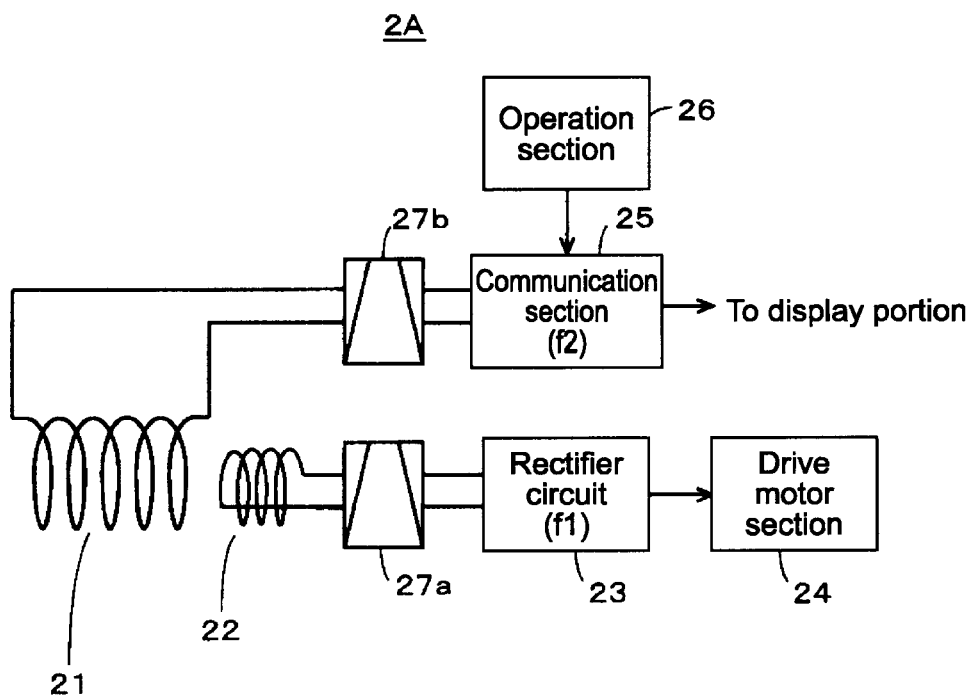
FIG. 8 is a diagram for explaining a structural example of a moving body of the second embodiment.

Next, a structural example of the moving body 2A will be described. FIG. 8 is a diagram for explaining a structural example of the moving body 2A of the second embodiment. The moving body 2A of the second embodiment relays not only power but also an information signal (display message).

As shown in FIG. 8, the moving body 2A of this example includes a communication section 25 and an operation section 26 in addition to the relay resonance coil 21, the coupling coil 22, the rectifier circuit 23, and the drive motor section 24. The communication section 25 is connected to the relay resonance coil 21 so that the relay resonance coil 21 can also be used as a communication antenna.

Similar to the case of the power feed source 1 described above, if the communication section 25 and the relay resonance coil 21 are unconditionally connected to each other, impedance of the relay resonance coil 21 is lowered and a Q factor thereof is also lowered, which causes power feeding efficiency to be lowered as in the case of the power feed source 1 described above.

In this regard, also in the moving body 2A of the second embodiment, a filter circuit 27a is provided between the coupling coil 22 and the rectifier circuit 23, and a filter circuit 27b is provided between the communication section 25 and the relay resonance coil 21.

Then, as in the case of the power feed source 1 described above, the filter circuit 27b of the moving body 2A is designed to have sufficiently high impedance that does not lower a Q factor of the relay resonance coil 21 at a frequency f1. Further, the filter circuit 27a of the moving body 2A is designed to have appropriate impedance at which the coupling coil 22 does not adversely affect the wireless communication at a frequency f2. Here, the appropriate impedance differs depending on the frequency f2 or a structure of the coupling coil 22.

Accordingly, in a case where power is fed from the power feed source 1 and relayed to a power feed destination, impedance of the relay resonance coil 21 is kept high and a Q factor thereof is also kept high due to the function of the filter circuit 27b, with the result that power can be fed and relayed (transmitted) without lowering power receiving efficiency or power feeding efficiency.

On the other hand, in a case where information from the power feed source 1 is received or information from the communication section 25 is transmitted, a frequency band of a signal of the information is set as a high-frequency band of several MHz or more, and impedance is lowered due to the function of the filter circuit 27b at a time other than at the frequency f1.

In other words, the filter circuit 27b keeps impedance high at the frequency f1, and lowers the impedance other than at the frequency f1. Accordingly, in this case, a Q factor of the relay resonance coil 21 can be lowered and the information signal can be desirably transmitted and received.

Accordingly, first, the moving body 2A receives an information signal (display message) from the power feed source 1 via the relay resonance coil 21, the filter circuit 27b, and the communication section 25. Then, the communication section 25 adds information that is input via the operation section 26 to the received information signal as necessary, with the result that a high-frequency information signal can be desirably transmitted to the power feed destination 3 via the filter circuit 27b and the relay resonance coil 21.

After that, the AC power from the power feed source 1 can be received via the relay resonance coil 21, supplied to the rectifier circuit 23 via the coupling coil 22 and the filter circuit 27a, converted into DC power, and then supplied to the drive motor section 24. At the same time, the AC power from the power feed source 1 is relayed to the power feed destination 3 via the relay resonance coil 21 without lowering the power feeding efficiency.

It should be noted that the information that is input via the operation section 26 is, for example, information of a name or nickname of a user, with which a display message such as "Mr. XX, xx shop is on sale." that is beneficial for only the user riding on the moving body 2A can be displayed.

Further, in a case where the display message has been set in a power feed destination in advance, the moving body 2A can transmit the information of the user name or the like that has been received via the operation section 26, as information that constitutes part of the display message, to the power feed destination.

In other words, the moving body 2A does not only relay the information signal from the power feed source 1. For example, the moving body 2A can independently transmit, for example, only an information signal generated in the moving body 2A based on information or the like received via the operation section 26 to the power feed destination 3 via the communication section 25, the filter circuit 27b, and the relay resonance coil 21.

(Structural Example of Power Feed Destination 3)

Next, a structural example of the power feed destination 3 will be described. FIG. 9 is a diagram for explaining a structural example of the power feed destination 3 of the second embodiment. The power feed destination 3 of the second embodiment receives not only power but also relay of a display message via the moving body 2A.

As shown in FIG. 9, the power feed destination 3 of this example includes a communication section 35 in addition to the reception resonance coil 31, the coupling coil 32, the rectifier circuit 33, and an electronic billboard 34 as a load circuit. The communication section 35 is connected to the reception resonance coil 31 so that the reception resonance coil 31 can also be used as a communication antenna.

Also in the case of the power feed destination 3, if the communication section 35 and the reception resonance coil 31 are unconditionally connected to each other, impedance of the reception resonance coil 31 is lowered and a Q factor thereof is also lowered, which causes power receiving efficiency to be lowered as in the case of the power feed source 1 and moving body 2A described above.

In this regard, also in the power feed destination 3 of the second embodiment, a filter circuit 36a is provided between the coupling coil 32 and the rectifier circuit 33, and a filter circuit 36b is provided between the communication section 35 and the reception resonance coil 31.

Then, as in the case of the power feed source 1 and moving body 2A described above, the filter circuit 36b of the power feed destination 3 is designed to have sufficiently high impedance that does not lower a Q factor of the reception resonance coil 31 at a frequency f1. Further, the filter circuit 36a of the power feed destination 3 is designed to have appropriate impedance at which the coupling coil 32 does not adversely affect the wireless communication at a frequency f2. Here, the appropriate impedance differs depending on the frequency f2 or a structure of the coupling coil 32.

Accordingly, in a case where power is fed from the moving body 2A, impedance of the reception resonance coil 31 is kept high and a Q factor thereof is also kept high due to the function of the filter circuit 36b, with the result that power can be received without lowering the power receiving efficiency.

On the other hand, in a case where information from the moving body 2A is received, a frequency band of a signal of the information is set as a high-frequency band of several MHz or more and impedance is lowered due to the function of the filter circuit 36b at a time other than at the frequency f1.

In other words, the filter circuit 36b keeps impedance high at the frequency f1, and lowers the impedance other than at the frequency f1. Accordingly, in this case, a Q factor of the reception resonance coil 31 can be lowered and the information signal can be desirably transmitted and received.

Accordingly, first, the power feed destination 3 can smoothly receive an information signal (display message) from the power feed source 1 that is relayed by the moving body 2A via the reception resonance coil 31, the filter circuit 36b, and the communication section 35.

The communication section 35 extracts a display message from the received information signal, converts the display message into an information signal to be supplied to the electronic billboard 34, and then supplies the information signal to the electronic billboard 34, with the result that the display message can be displayed on the electronic billboard 34.

After that, the AC power supplied from the power feed source 1 via the moving body 2A is received via the reception resonance coil 31, supplied to the rectifier circuit 33 via the coupling coil 32 and the filter circuit 36a, and converted into DC power, with the result that the DC power can be supplied to the electronic billboard 34.

Accordingly, the display message from the power feed source 1 that is relayed and supplied by the moving body 2A is supplied to the electronic billboard 34, and the electronic billboard 34 is driven by the power from the power feed source 1 that is relayed and supplied by the moving body 2A, with the result that the display message can be displayed.

(Effects of Second Embodiment)

The magnetic-field-resonance-type noncontact power feed system can be applied to a system in which an automobile that moves while taking humans thereon is used as a moving relay apparatus.

Further, the magnetic-field-resonance-type noncontact power feed system can provide necessary information to users who ride on the moving body 2A as an automobile at an appropriate timing or guide the users to a shop or another amusement attraction.

(Modified Example of Second Embodiment)

It should be noted that though impedance is adjusted using the filter circuits in the apparatuses described with reference to FIGS. 7 to 9, the present invention is not limited thereto. For example, switching circuits may be provided instead of the filter circuits.

For example, in the case of the power feed source 1 shown in FIG. 7, a switching circuit 16b is provided at the position of the filter circuit 15b, i.e., between the communication section 14 and the transmission resonance coil 13. Further, a switching circuit 16a is provided at the position of the filter circuit 15a, i.e., between the AC power source 11 and the coupling coil 12.

Then, the switching circuit 16a is turned on and the switching circuit 16b is turned off when power is fed. Accordingly, impedance of the transmission resonance coil 13 can be kept high and power from the AC power source can be fed efficiently.

In addition, the switching circuit 16a is turned off and the switching circuit 16b is turned on when communication is performed. Accordingly, the information signal from the communication section 14 can be appropriately transmitted via the transmission resonance coil 13.

As described above, the switching circuits may be provided instead of the filter circuits and switched when power is fed and communication is performed. It should be noted that also in the moving body 2A and the power feed destination 3, switching circuits may be similarly provided to a communication system and a power feed system and switched when communication is performed and power is fed (received).

Further, in the examples described with reference to FIGS. 7 to 9, the transmission resonance coil 13, the relay resonance coil 21, and the reception resonance coil 31 are also used as the communication antenna, and the supply of the power and the supply of the information signal are performed using the same path as much as possible.

However, the present invention is not limited to the above case. Since the information signal can be transmitted with a relatively small amount of power and a large amount of information can be transmitted at high-speed, an antenna designated for communication may of course be provided.

Specifically, in the case of the power feed source 1 shown in FIG. 7, the communication section 14 is connected to not the transmission resonance coil 13 but a communication antenna that is newly provided. Further, in the case of the moving body 2A shown in FIG. 8, the communication section 25 is connected to not the relay resonance coil 21 but a communication antenna that is newly provided. Furthermore, in the case of the power feed destination 3 shown in FIG. 9, the communication section 35 is connected to not the reception resonance coil 31 but a communication antenna that is newly provided.

With this structure, the communication system and the power feed system may be separated and independently transmit/receive information signals and power, respectively. In this case, since the transmission/reception of information signals and the transmission/reception of power can be performed at the same time, the effect that the transmission/reception of information signals is easily controlled, or the like can be produced.

Further, in the case of the noncontact power feed system of the second embodiment, the moving body 2A also receives supply of power from the power feed source 1, but the present invention is not limited thereto. For example, the moving body 2A may be equipped with a drive battery and travel by power from the drive battery.

In addition, the moving body 2A may include an AC power source and feed the power generated in the moving body 2A (AC power) to a power feed destination. That is, the moving body 2A can be given a function as the power feed source 1.

(Application to Method of the Present Invention)

The noncontact power feed method in the noncontact power feed system described with reference to FIGS. 1 to 9 is one of noncontact power feed methods of the present invention. Further, the noncontact power feed method for the moving bodies 2 and 2A descried with reference to FIGS. 3 and 8 is one of the noncontact power feed methods of the present invention. Moreover, the noncontact power feed method for the power feed destination descried with reference to FIGS. 4 and 9 is one of the noncontact power feed methods of the present invention.

(Others)

It should be noted that though the moving bodies 2 and 2A have been described as one having an automobile shape or as an automobile in the embodiments described above, but the present invention is not limited thereto. Moving bodies of various modes such as a hull-type moving body that moves on the water, an airplane-type moving body that flies in the air, and an elevator-type moving body that vertically moves can be structured and used.

Further, the power feed destination has been described as one using a light-emitting device and a display device, such as an LED and an electronic billboard in the embodiment described above, but the present invention is not limited thereto. As the load circuit of the power feed destination that receives supply of the power from a moving body, various circuits such as a circuit for generating/releasing sound, an oscillation circuit, and a photographing circuit can be used.

Moreover, the case where power is supplied in a noncontact manner by a magnetic field resonance system has been described in the embodiments described above, but the present invention can be similarly applied to a case where power is supplied in a noncontact manner by using not only the magnetic field resonance system but also an electric field resonance system and an electromagnetic resonance system.

In addition, the power feed source is provided with the coupling coil (coupling device) between the AC power source and the transmission resonance coil in the embodiments described above. Further, the moving body is provided with the coupling coil (coupling device) between the relay resonance coil and the rectifier circuit. Furthermore, the power feed destination is provided with the coupling coil (coupling device) between the reception resonance coil and the rectifier circuit.

However, the present invention is not limited to the above case, and can be structured without using the above coupling coils (coupling devices) as long as the reflection of power or the problems of impedance can be suppressed.

The present application contains subject matter related to that disclosed in Japanese Priority Patent Application JP 2009-171797 filed in the Japan Patent Office on Jul. 23, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A noncontact power feed system, comprising:
a noncontact power feed apparatus including
a power feed resonance device to supply alternate-current power to an electronic apparatus by resonance in a noncontact manner, and
an alternate-current power source section to generate the alternate-current power having a frequency corresponding to a resonant frequency of the power feed resonance device and supply the alternate-current power to the power feed resonance device;
a noncontact relay apparatus including
a relay resonance device to receive supply of the alternate-current power from the power feed resonance device of the noncontact power feed apparatus by resonance in a noncontact manner and relay the alternate-current power to another electronic apparatus by resonance in a noncontact manner,
a relay-side rectifier circuit to form direct-current power based on the alternate-current power supplied from the relay resonance device and output the direct-current power, and
a movement means for moving the noncontact relay apparatus by being driven by the direct-current power from the relay-side rectifier circuit; and
at least one noncontact power reception apparatus including
a power reception resonance device to receive supply of the alternate-current power from the relay resonance device of the noncontact relay apparatus by magnetic field resonance in a noncontact manner,
a power-reception-side rectifier circuit to form direct-current power based on the alternate-current power supplied from the power reception resonance device and output the direct-current power, and
a load means driven by the direct-current power from the power-reception-side rectifier circuit.

2. The noncontact power feed system according to claim 1, wherein the noncontact power feed apparatus includes a power-feed-side coupling device that is provided between the alternate-current power source section and the power feed resonance device, and receives the supply of the alternate-current power from the alternate-current power source section and supplies the alternate-current power to the power feed resonance device by electromagnetic induction,
wherein the noncontact relay apparatus includes a relay-side coupling device that is provided between the relay resonance device and the relay-side rectifier circuit, and receives the supply of the alternate-current power from the relay resonance device by the electromagnetic induction and supplies the alternate-current power to the relay-side rectifier circuit, and
wherein the at least one noncontact power reception apparatus includes a power-reception-side coupling device that is provided between the power reception resonance device and the power-reception-side rectifier circuit, and receives the supply of the alternate- current power from the power reception resonance device by the electromagnetic induction and supplies the alternate-current power to the power-reception-side rectifier circuit.

3. The noncontact power feed system according to claim 1, wherein the noncontact power feed apparatus includes a transmission means for transmitting information,
wherein the noncontact relay apparatus includes a reception and transmission means for receiving the information from the noncontact power feed apparatus and transmitting the information to the at least one noncontact power reception apparatus,
wherein the load means of the at least one noncontact power reception apparatus is a display means, and
wherein the at least one noncontact power reception apparatus includes
a reception means for receiving information, and
a display control means for displaying the information received by the reception means on the display means.

4. The noncontact power feed system according to claim 1, wherein the noncontact relay apparatus includes
an acceptance means for accepting an input of information, and
a transmission means for transmitting the information accepted via the acceptance means, wherein the load means of the at least one noncontact power reception apparatus is a display means, and
wherein the at least one noncontact power reception apparatus includes
a reception means for receiving information, and
a display control means for displaying the information received by the reception means on the display means.

5. A noncontact relay apparatus, comprising:
a relay resonance device to receive supply of alternate-current power from a power feed resonance device of a noncontact power feed apparatus by resonance in a non-contact manner and relay the alternate-current power to another electronic apparatus by resonance in a noncontact manner;
a relay-side rectifier circuit to form direct-current power based on the alternate-current power supplied from the relay resonance device and output the direct-current power; and
a moving means for moving the noncontact relay apparatus by being driven by the direct-current power from the relay-side rectifier circuit.

6. The noncontact relay apparatus according to claim 5, further comprising
a relay-side coupling device that is provided between the relay resonance device and the relay-side rectifier circuit, and receives the supply of the alternate-current power from the relay resonance device by electromagnetic induction and supplies the alternate-current power to the relay-side rectifier circuit.

7. The noncontact relay apparatus according to claim 5, further comprising
a reception and transmission means for receiving information from the noncontact power feed apparatus and transmitting the information to a noncontact power reception apparatus.

8. The noncontact relay apparatus according to claim 5, further comprising:
an acceptance means for accepting an input of information; and
a transmission means for transmitting the information accepted via the acceptance means.

9. A noncontact power reception apparatus, comprising:
a power reception resonance device to receive supply of alternate-current power from a relay resonance device of a noncontact power reception/relay apparatus having a movable structure driven by alternating current supplied by magnetic field resonance in a noncontact manner;
a power-reception-side rectifier circuit to form direct-current power based on the alternate-current power supplied from the power reception resonance device and output the direct-current power; and
a load means driven by the direct-current power from the power-reception-side rectifier circuit.

10. The noncontact power reception apparatus according to claim 9, further comprising
a power-reception-side coupling device that is provided between the power reception resonance device and the power-reception-side rectifier circuit, and receives supply of the alternate-current power from the power reception resonance device by electromagnetic induction and supplies the alternate-current power to the power-reception-side rectifier circuit.

11. The noncontact power reception apparatus according to claim 9,
wherein the load means is a display means,
the noncontact power reception apparatus further comprising:
a reception means for receiving information; and
a display control means for displaying the information received by the reception means on the display means.

12. A noncontact power feed method in a noncontact power feed system, comprising:
transmitting, by a first apparatus, alternate-current power via a first resonance coil in a resonance system;
receiving, by a second apparatus, the alternate-current power transmitted from the first apparatus via a second resonance coil resonating at a frequency that is one of the same and substantially the same as a frequency of the first resonance coil of the first apparatus;
relaying and transmitting, by the second resonance coil of the second apparatus, the alternate-current power received from the first apparatus;
moving, the second apparatus by using the alternate-current power received from the first apparatus;
receiving, by a third apparatus, the alternate-current power transmitted from the second apparatus via a third resonance coil resonating at a frequency that is one of the same and substantially the same as the frequency of the second resonance coil of the second apparatus when the second apparatus comes close to the third apparatus; and
driving, by the third apparatus, a predetermined load circuit by using the alternate-current power received from the second apparatus.

13. A noncontact power feed method in a noncontact relay apparatus, comprising:
receiving alternate-current power transmitted from a noncontact power feed apparatus via a reception and transmission resonance coil resonating in a non-contact manner at a frequency that is one of the same and substantially the same as a frequency of a transmission resonance coil of the noncontact power feed apparatus;
relaying and transmitting the alternate-current power received from the noncontact power feed apparatus via the reception and transmission resonance coil; and
moving the noncontact relay apparatus by using the alternate-current power received from the noncontact power feed apparatus.

14. A noncontact power feed method in a noncontact power reception apparatus, comprising:
receiving alternate-current power transmitted from a noncontact power relay apparatus via a reception resonance coil resonating in a non-contact manner at a frequency that is one of the same and substantially the same as a frequency of a reception and transmission resonance coil of the noncontact power relay apparatus when the noncontact power relay apparatus having a movable structure driven by an alternating current comes close to the noncontact power reception apparatus; and
driving a predetermined load circuit by using the alternate-current power received from the noncontact power reception/relay apparatus.

15. The noncontact power feed system of claim 1, wherein the noncontact relay apparatus is an automobile which is driven by the direct-current power supplied to a motor and is in motion, along a predetermined guide, with respect to the stationary power feed resonance device and the power reception resonance device.

* * * * *

UNITED STATES PATENT AND TRADEMARK OFFICE
CERTIFICATE OF CORRECTION

PATENT NO. : 8,552,594 B2
APPLICATION NO. : 12/820330
DATED : October 8, 2013
INVENTOR(S) : Hirotsugu Wada et al.

It is certified that error appears in the above-identified patent and that said Letters Patent is hereby corrected as shown below:

On the title page, Item (54) and in the Specification, Column 1, the Title of Invention is incorrect. Item (54) and Column 1 should read:

--NONCONTACT POWER FEED SYSTEM, NONCONTACT RELAY APPARATUS, NONCONTACT POWER RECEPTION APPARATUS, AND NONCONTACT POWER FEED METHOD--

Signed and Sealed this
Tenth Day of December, 2013

Margaret A. Focarino
*Commissioner for Patents of the United States Patent and Trademark Office*